Jan. 18, 1949.     K. J. WATSON     2,459,478
VEHICLE

Filed May 29, 1947     2 Sheets-Sheet 1

Inventor
Kenneth J. Watson

By McMorrow, Berman & Davidson
Attorneys

Jan. 18, 1949.   K. J. WATSON   2,459,478
VEHICLE

Filed May 29, 1947   2 Sheets-Sheet 2

Inventor
Kenneth J. Watson

By McMorrow, Berman & Davidson
Attorneys

Patented Jan. 18, 1949

2,459,478

UNITED STATES PATENT OFFICE 2,459,478

VEHICLE

Kenneth J. Watson, North Hollywood, Calif.

Application May 29, 1947, Serial No. 751,195

7 Claims. (Cl. 272—29)

This invention relates to improvements in occupant-propelled vehicles and more particularly to an improved vehicle in the form of a velocipede or tricycle especially adapted for use by children as an amusement and educational or exercising device.

It is among the objects of the invention to provide an improved vehicle which is capable of movement in any direction on a horizontal supporting surface, such as a floor, and a portion of which is movable independently of movement of the vehicle itself relative to the supporting surface, which is simple to operate and safe for a small child to use, which can be used indoors without injuring walls, floors or furniture, and which is simple in construction, attractive in appearance and economical to manufacture.

A somewhat more specific object resides in the provision of a child's velocipede which can be used as an occupant-propelled, steerable vehicle movable in any desired direction on a supporting surface, and as a merry-go-round while the vehicle is stationary, and which is also capable of a combined seat-rotating and floor-progressing movement.

Other objects and advantages will become apparent from a consideration of the following description in conjunction with the accompanying drawings, wherein:

Figure 3 is a transverse section on the line 3—3 of Figure 1 on a somewhat enlarged scale.

Figure 1:
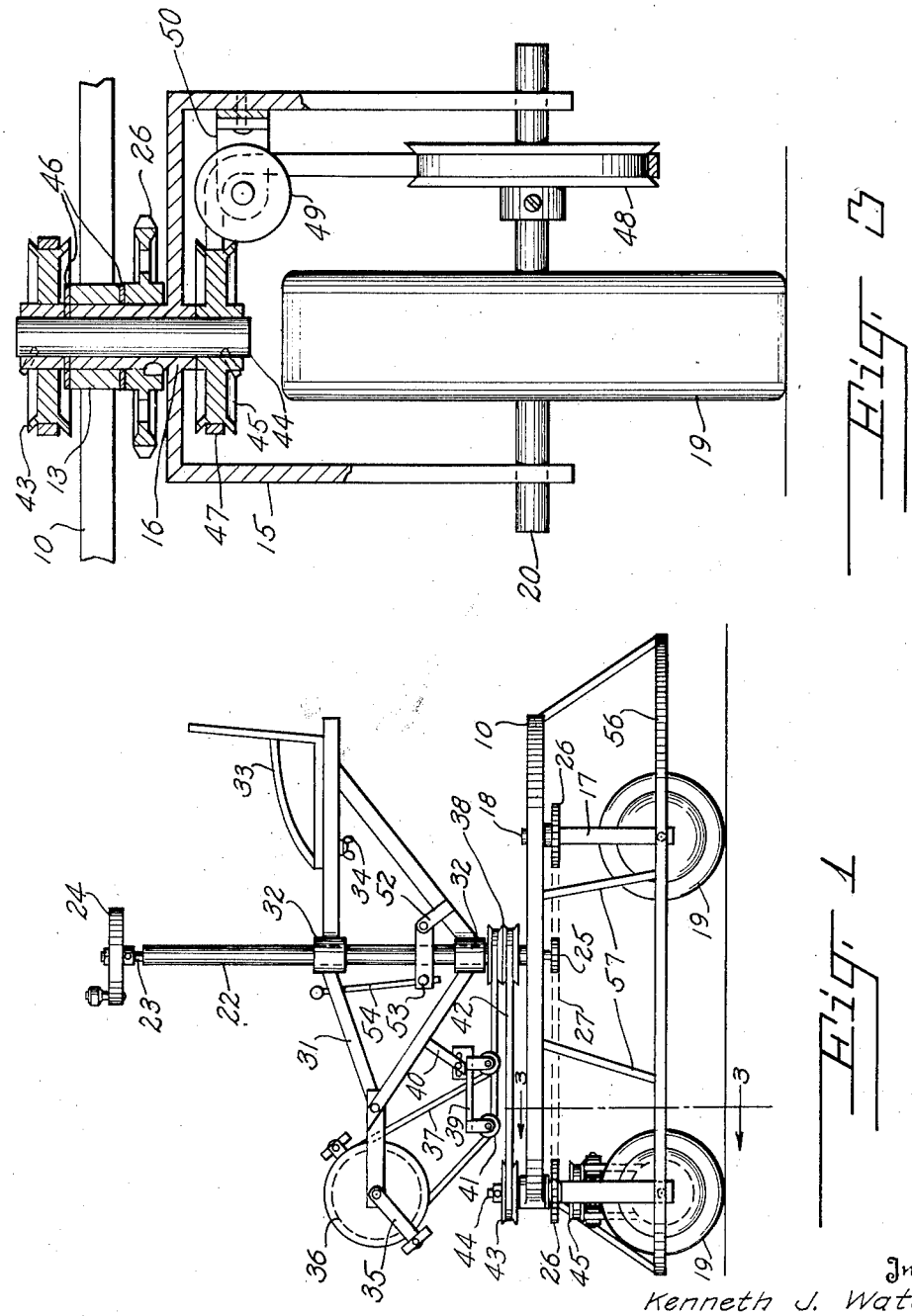
Figure 1 is a side elevation of a vehicle illustrative of the invention.

With continued reference to the drawings, the vehicle has a base which may conveniently comprise a circular ring 10 having at the center thereof a plate 11 supported on the ring 10 by radially-extending bolts or straps 12. Three bearing sleeves are secured to the ring 10 at substantially equal angular intervals there-around, one sleeve 13 preferably being larger than the two other sleeves 14.

A wheel-carrying fork 15 has a tubular stem 16 journaled in the larger bearing sleeve and wheel-carrying forks 17 have stems 18 which may be tubular or solid, as desired, journaled in the bearing sleeves 14.

Wheels 19 are journaled in the forks 15 and 17, the wheel in the fork 15 being supported on an axle 20 and the wheels in the forks 17 being supported on axles 21. Each axle extends through the corresponding wheel and through the legs of the associated fork.

Figure 2:
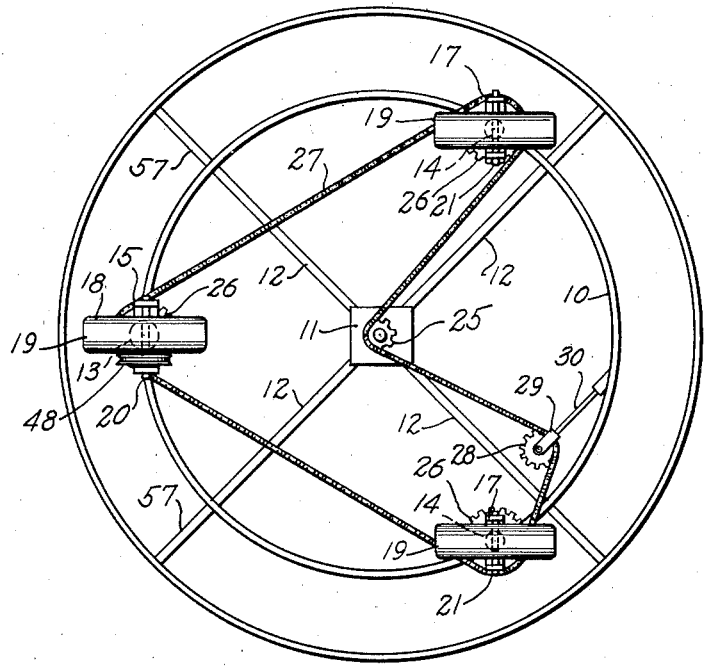
Figure 2 is a bottom plan view of the vehicle illustrated in Figure 1.
Figure 4:
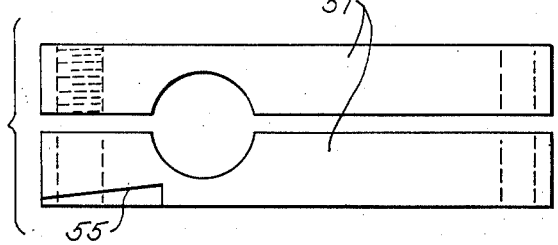
Figure 4 is a plan view of a brake mechanism constituting an operative component of the vehicle.
Figure 5:
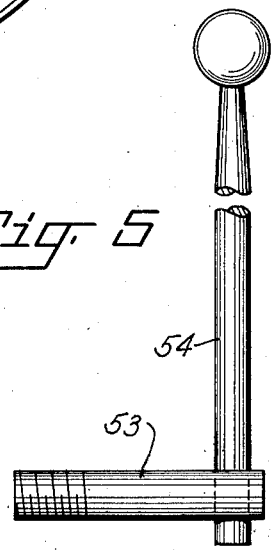
Figure 5 is an elevation of a brake-operating screw and lever.

When the vehicle is in operative position the base ring 10 is substantially horizontal with the supporting wheels 19 below it and resting upon the supporting surface such as a floor. A tubular stem 22 is secured at its lower end to the support plate 11 as the center of ring 10 and extends upwardly substantially at right angles to the plane of the base ring. A steering shaft 23 extends through the stem 22 and through the support plate 11 and has a steering wheel 24 secured on the upper end thereof and a small chain sprocket 25 secured on its lower end below the support plate. Chain sprockets 26 are secured one to each wheel-carrying fork and a chain 27 is extended around the sprockets 26 and the sprocket 25 so that when the steering shaft 23 is turned all of the wheel forks will be simultaneously turned to steer the wheel. An idler sprocket 28 journaled in a U-shaped bracket 29 bears against the chain 27 and is secured to the ring 10 by an adjustable extension link 30 to apply the proper tension to the chain. In the manner in which the chain and sprockets are arranged in Figure 2, the steering will be reversed in comparison with the steering of conventional vehicles. This is not regarded as a disadvantage in this particular type of vehicle, but the steering action may be changed if desired by re-arranging the engagement between the chain 27 and the steering sprocket 25.

While the illustrated vehicle has three wheels disposed at the apices of an isosceles triangle, the wheels may be differently arranged or a different number may be used without in any way exceeding the scope of the invention.

A rigid frame 31 is journaled on the stem 22 by the spaced-apart bushings 32 and extends to opposite sides of the stem. A seat 33 is mounted on one end of the frame for sliding adjustment toward and away from the stem and is releasably held in adjusted position by suitable means such as the clamp screw 34 secured to the seat and extending through a longitudinal slot, not illustrated, in the frame.

A pedal crank 35 is journaled in the opposite end of the frame and has a belt pulley 36 fixed thereto.

A belt 37 passes over the pulley 36 and around the upper part of a double pulley 38 journaled on the stem 22 between the lower frame supporting bushing 32 and the support plate 11. A belt tightener for this belt comprises an elongated frame 39 adjustably secured to a bracket 40 depending from a lower strut of the frame 31 and carrying a pair of space-apart idler pulleys 41 respectively engageable with the two sides of the belt as is clearly illustrated in Figure 1. As the belt turns through a 90° angle between the pulley 36 and the double pulley 38 the idler pulleys 41 are disposed at an angle to assist in guiding the belt through this right-angular turn. The tension on the belt 37 may be adjusted by moving the belt-tightener frame 39 toward or away from the stem 22 and securing the frame in adjusted position to the bracket 40.

A belt 42 passes around the lower part of the double pulley 38 and around a pulley 43 secured on the upper end of a shaft 44 which extends downwardly through the tubular stem 16 of the fork 15 and carries a corresponding belt pulley 45 on the lower end thereof. Preferably the fork stem 16 is held in operative position in the bearing sleeve 13 and the shaft 44 is held in operative position in the tubular stem 16 by the hubs of the pulleys 43 and 45. If desired, bearing washers 46 may be disposed one at each end of the bearing sleeve 13 to provide upper and lower thrust bearings between the fork and the bearing sleeve.

A belt 47 is engaged around the pulley 45 and around a pulley 48 mounted on the axle 20 beside the associated wheel 19. As the rotational axes of the pulleys 45 and 48 are at right angles to each other the belt 47 is carried around a right-angle bend over a pair of guide pulleys 49 journaled at the outer end of a U-shaped bracket 50 secured to the inner side of the adjacent leg of the fork 15.

With this arrangement, when the pedal crank 35 is rotated power will be transmitted through the belt 37 to the double pulley 38 mounted on the stem 22. If the frame is free to rotate about the stem, the frame will be so rotated upon rotation of the pedal crank, the double pulley 38 remaining stationary and the belt 37 traveling around it. If, on the other hand, the frame is held against rotation relative to the stem 22 the double pulley 38 will be driven, driving the pulleys 43 and 45 and the pulley 48 which will in turn drive the associated wheel 19 and move the vehicle.

Rotation of the frame about the stem 22 is controlled by a brake comprising a pair of brake shoes 51 surrounding the stem and connected at one end to a bracket 52 projecting outwardly from a lower strut member of the frame 31. At the opposite ends the shoes 51 receive a screw member 53 having a manually-movable lever 54 connected to one end thereof. One of the shoes 51 is provided with a cam surface 55 engaged by the associated end portion of the lever 54 so that when the lever is moved in one direction the shoes will be brought into braking engagement with the stem 22 to hold the frame 31 against rotation relative to the stem, and when the lever is moved in the opposite direction the brake shoes will be released from the stem to free the frame for rotation relative to the stem. By properly adjusting the brake, a combination of movement of the vehicle over the floor and rotation of the frame around the stem can be obtained. If during such combined movement an occupant firmly holds the steering wheel 24 the vehicle will be caused to move in a circle or spiral while the frame is being rotated about the stem. The device thus provides either a bodily-movable vehicle or a merry-go-round or a combination of the two devices as may be desired.

A guard ring 56 surrounds the wheels below the base ring 10 and is connected to the base ring by a suitable supporting strut 57 to prevent a person using the vehicle from coming into contact with the wheels and forks and also to prevent any sharp or angular portions of the vehicle from coming into contact with the walls of a room or with furniture or other objects which might be injured by impact of the vehicle therewith. The wheels are provided with tires of resilient material which protect the surface of a floor upon which the vehicle is used.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An occupant-propelled vehicle comprising a circular base having a central support plate and three bearing sleeves disposed circumferentially of said base at substantially equal angular intervals, three wheel-straddling forks each having a stem journaled in a respective bearing sleeve, a chain sprocket secured to each fork to control rotation thereof in the corresponding bearing sleeves, a wheel journaled in each fork, a tubular stem fixed at one end to said central support plate and extending substantially perpendicular to said base ring at the side thereof opposite said wheels, a steering shaft extending through said stem and said bearing plate, a steering wheel on said shaft at the other end of said stem, a sprocket wheel on the end of said shaft extending through said support plate, a chain operatively engaging said sprocket wheels to turn said forks when said steering shaft is turned, a pair of spaced-apart bushings rotatable on said stem and held against movement lengthwise thereof, a frame supported on said bushings and extending at opposite sides of said stem, a seat adjustably supported on said frame at one side of said stem, a pedal crank and associated pulley journaled on said frame at the opposite side of said stem, and power-transmitting means operatively connecting said pedal-crank-pulley and one of said wheels to drive said wheel when said pedal crank is rotated.

2. An occupant-propelled vehicle comprising a circular base having a central support plate and three bearing sleeves disposed circumferentially of said base at substantially equal angular intervals, three wheel-straddling forks each having a stem journaled in a respective bearing sleeve, one of said stems being tubular, a chain sprocket secured to each fork to control rotation thereof in the corresponding bearing sleeves, a wheel journaled in each fork, a tubular stem fixed at one end to said central support plate and extending substantially perpendicular to said base ring at the side thereof opposite said wheels, a steering shaft extending through said stem and said bearing plate, a steering wheel on said shaft at the other end of said stem, a sprocket wheel on the end of said shaft extending through said support plate, a chain operatively engaging said sprocket wheels to turn said forks when said steering shaft is turned, a pair of spaced-apart bushings rotatable on said stem and held against movement lengthwise thereof, a frame supported on said bushings and extending at opposite sides of said stem, a seat adjustably supported on said frame at one side of said stem, a pedal crank and associated pulley journaled on said frame at the opposite side of said stem, and power-transmitting means operatively connecting said pedal-crank pulley and one of said wheels to drive said wheel when said pedal crank is rotated, said power-transmitting means comprising a double pulley rotatably mounted on said stem, a shaft extending through the tubular stem of the fork carrying said one wheel, a pulley on each end of said shaft, a pulley secured to said one wheel, guide pulleys between said wheel-secured pulley and the adjacent shaft-carried pulley, and belts connecting said pedal-crank pulley with said double pulley, said double pulley with one of said shaft-carried pulleys, and the other of said shaft-carried pulleys with said wheel-secured pulley.

3. An occupant-propelled vehicle comprising a circular base having a central support plate and three bearing sleeves disposed circumferentially of said base at substantially equal angular intervals, three wheel-straddling forks each having a stem journaled in a respective bearing sleeve, a chain sprocket secured to each fork to control rotation thereof in the corresponding bearing sleeve, a wheel journaled in each fork, a tubular stem fixed at one end to said central support plate and extending substantially perpendicular to said base ring at the side thereof opposite said wheels, a steering shaft extending through said stem and said bearing plate, a steering wheel on said shaft at the other end of said stem, a sprocket wheel on the end of said shaft extending through said support plate, a chain operatively engaging said sprocket wheels to turn said forks when said steering shaft is turned, a pair of spaced-apart bushings rotatable on said stem and held against movement lengthwise thereof, a frame supported on said bushings and extending at opposite sides of said stem, a seat adjustably supported on said frame at one side of said stem, a pedal crank and associated pulley journaled on said frame at the opposite side of said stem, and power-transmitting means operatively connecting said pedal-crank-pulley and one of said wheels to drive said wheel when said pedal crank is rotated, and a guard ring secured to said base and surrounding said wheels.

4. An occupant-propelled vehicle comprising a base having bearing sleeves thereon, wheel-carrying forks having stems journaled respectively in said bearing sleeves, wheels journaled respectively in said forks, a stem supported on said base, a steering shaft extending through said stem on said base, a chain sprocket on said steering shaft and on each of said forks, a chain connecting said sprockets whereby said forks are turned to steer said wheels when said steering shaft is turned, a frame journaled on said stem and extending to opposite sides thereof, a seat carried by said frame at one side of said stem, a pedal crank carried by said frame at the opposite side of said stem, power-transmitting means drivingly connecting said pedal crank with one of said wheels and including a double pulley journaled on said stem whereby operation of said pedal crank is effective to drive said one wheel or rotate said frame around said stem, and a manually-controllable brake operatively associated with said frame and said stem to lock said frame to said stem and thereby render said pedal crank effective to drive said one wheel, or to release said frame to revolve about said stem.

5. An occupant-propelled vehicle comprising a base, wheels operatively mounted on one side of said base, a stem operatively mounted on the opposite side of said base, a frame journaled on said stem, a seat and a pedal crank carried by said frame, means drivingly connecting said pedal crank with one of said wheels including pulley means journaled on said stem whereby said pedal crank is effective to drive said one wheel or rotate said frame about said stem, and a brake carried by said frame and engageable with said stem to hold said frame against movement relative to said stem.

6. A vehicle having a base, a plurality of wheels supporting said base, a stem secured at one end to said base, an occupant-supporting frame journaled on said stem, an occupant-operated crank carried by said frame, means operatively connecting said crank with said stem and one of said vehicle-supporting wheels whereby said crank is effective to drive said vehicle or to rotate said frame about said stem, a brake operatively associated between said frame and said stem, and vehicle-steering means operatively associated with said stem and said wheels for simultaneously steering said wheels.

7. A vehicle comprising a base, wheels supporting said base, a frame supported on said base for rotation thereon, driving means carried by said frame, means operatively connecting said driving means with said base and at least one of said wheels to render said driving means effective to rotate said frame relative to said base or drive said vehicle, and means operatively connected between said frame and said base to selectively render said driving means effective to drive said vehicle or rotate said frame.

KENNETH J. WATSON.

REFERENCES CITED

The following references are of record in the file of this patent:

UNITED STATES PATENTS

| Number | Name | Date |
| --- | --- | --- |
| 956,331 | Fuessel | Apr. 26, 1910 |
| 1,642,591 | Morris | Sept. 13, 1927 |